(12) United States Patent  
Wang

(10) Patent No.: US 7,793,949 B2
(45) Date of Patent: Sep. 14, 2010

(54) FOLDABLE VEHICLE FRAME

(75) Inventor: Arthur Wang, Kaohsiung County (TW)

(73) Assignee: Freerider Corp., Kaohsiung County (TW)

( * ) Notice: Subject to any disclaimer, the term of this patent is extended or adjusted under 35 U.S.C. 154(b) by 224 days.

(21) Appl. No.: 12/132,046

(22) Filed: Jun. 3, 2008

(65) Prior Publication Data

US 2009/0295127 A1    Dec. 3, 2009

(51) Int. Cl.
*B62B 3/02*    (2006.01)
(52) U.S. Cl. .......................... 280/37; 280/639; 280/651
(58) Field of Classification Search .............. 280/638, 280/35, 639, 37, 38, 42, 651, 656
See application file for complete search history.

(56) References Cited

U.S. PATENT DOCUMENTS

| | | | | |
|---|---|---|---|---|
| 3,314,494 A * | 4/1967 | Weitzner | .................... | 180/208 |
| 5,114,164 A * | 5/1992 | Bothwell et al. | .............. | 280/37 |
| 5,318,312 A * | 6/1994 | Montemayor | ................ | 280/30 |
| 6,688,614 B2 * | 2/2004 | Hsu | ............................. | 280/37 |
| 6,966,564 B2 * | 11/2005 | Hernandez, Jr. | ............ | 280/32.6 |
| 7,389,997 B2 * | 6/2008 | Johnson et al. | .......... | 280/47.19 |
| 7,503,439 B2 * | 3/2009 | O'Shea et al. | ............ | 190/18 A |
| 2003/0071428 A1 * | 4/2003 | Kang | .......................... | 280/62 |
| 2004/0113395 A1 * | 6/2004 | Nimis | ........................ | 280/651 |

* cited by examiner

*Primary Examiner*—Glenn Dayoan
*Assistant Examiner*—John D Walters
(74) *Attorney, Agent, or Firm*—WPAT, PC; Justin King

(57) ABSTRACT

A foldable vehicle frame includes a first main body, a second main body having a pedal portion and at least one joint portion, and a connecting mechanism connected to the first main body and the second main body. The connecting mechanism further includes a pair of rod parts, and the pair of rod parts respectively has a head end and a tail end. The head end is rotatably connected to the first main body, and the tail end is rotatably connected to the second main body, such that the connecting mechanism is turned over and stacked at a lower layer of the first main body, and the pedal portion of the second main body is folded under the turned-over connecting mechanism, so as to form a folded state. Furthermore, the connecting mechanism, the first main body, and the second main body are all unfolded simultaneously to form an unfolded state.

10 Claims, 8 Drawing Sheets

FOLDABLE VEHICLE FRAME

BACKGROUND OF THE INVENTION

1. Field of Invention

The present invention relates to a foldable vehicle frame for a scooter or an electric scooter, and more particularly, to a foldable vehicle frame that is folded or unfolded through a connecting mechanism to enhance accommodation and portability features.

2. Related Art

In terms of taking vehicles instead of walking, various manned vehicles have been available, for example, an electric scooter without a seat, an electric scooter with a seat, and an electric scooter. In early days, the electric scooter with a seat is not equipped with a foldable mechanism, and such a design of the electric scooter is not suitable for a long-distance travel, so when a user has a demand for long-distance travel, it is difficult for the user to take along the electric scooter to the destination.

Although some manufacturers have gradually proposed a foldable structure for the electric scooter, the foldable structure design still has its own defects. For example, in some designs, only the seat or smaller parts can be disassembled, which is not that helpful for reducing the entire volume of the vehicle. Furthermore, although some structures indeed can be disassembled and folded, rod parts are used, so the disassembling process is rather complex and inconvenient. What's worse, after being disassembled, the electric scooter still cannot be put into the luggage compartment for public transportation vehicles, so it makes little help. Therefore, currently, there is no desirable solution to overcome the above problems.

SUMMARY OF THE INVENTION

In view of the above defects in the prior art, the present invention is directed to a foldable vehicle frame for a personal scooter or an electric scooter, which is capable of significantly reducing the volume, thereby being portable or accommodated.

In order to solve the above problems, the present invention provides a foldable vehicle frame suitable for a personal scooter or an electric scooter, which has a folded state and an unfolded state. The vehicle frame includes: a first main body, having at least one joint portion; a second main body, having a pedal portion and at least one joint portion; and a connecting mechanism, connected to the joint portion of the first main body and the joint portion of the second main body. The connecting mechanism further includes a pair of rod parts, and the pair of rod parts respectively has a head end and a tail end. The head end is rotatably connected to the joint portion of the first main body, and the tail end is rotatably connected to the joint portion of the second main body, such that the connecting mechanism is turned over and stacked at a lower layer of the first main body, and the pedal portion of the second main body is folded under the turned-over connecting mechanism to form the folded state. Furthermore, the connecting mechanism, the first main body, and the second main body are all unfolded to a limiting angle, so as to form the unfolded state.

In the vehicle frame of the present invention, the first main body may be a head portion of a vehicle or a tail portion of the vehicle, and the second main body may be a tail portion of a vehicle or a head portion of the vehicle corresponding to the first main body.

In the vehicle frame of the present invention, the connecting mechanism further includes a plate part disposed between the pair of rod parts, so as to form a plate structure connected as a whole.

In the vehicle frame of the present invention, the first main body or the second main body is connected to the connecting mechanism by a connecting rod and a base seat through using a pin or a bearing.

In the vehicle frame of the present invention, the first main body further includes a retractable handle on an end surface thereof, and the second main body has at least one set of anti-tip wheels on an end surface thereof. When the handle is pulled out, the set of anti-tip wheels is extended to form ground pulleys (casters).

Through the above technical means, the efficacies achieved by the present invention are listed as follows. The two main bodies (the first main body and the second main body) are connected by a foldable connecting mechanism on the vehicle frame, so as to make the vehicle frame be foldable. Through the design in the size of the connecting mechanism, the unfolded volume can be controlled, and a greatly reduced folded volume can be obtained after the connecting mechanism is folded, which is suitable for personal portability, or the vehicle can be folded into a luggage size, which is suitable for being put into the luggage set for accommodating public transportation vehicles. In addition, the vehicle frame of the present invention also has a retractable handle. After the vehicle frame is folded, the retractable handle may be grasped to pull out, so as to form a luggage-set (boarding bag) type foldable vehicle frame, which may be dragged through the pulleys. At this time, the anti-tip wheels at the other side of the foldable vehicle frame may be unfolded, so as to serve as the ground pulleys. As for the luggage-set design of the foldable vehicle frame, a heavier motor, a main power wheel, and a main structure body of the vehicle frame are all located at the bottom part, and the handle is disposed at the lighter head portion of the vehicle, which satisfies the ergonomics with the center of gravity at the lower part, such that the pulling operation becomes more natural and convenient.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
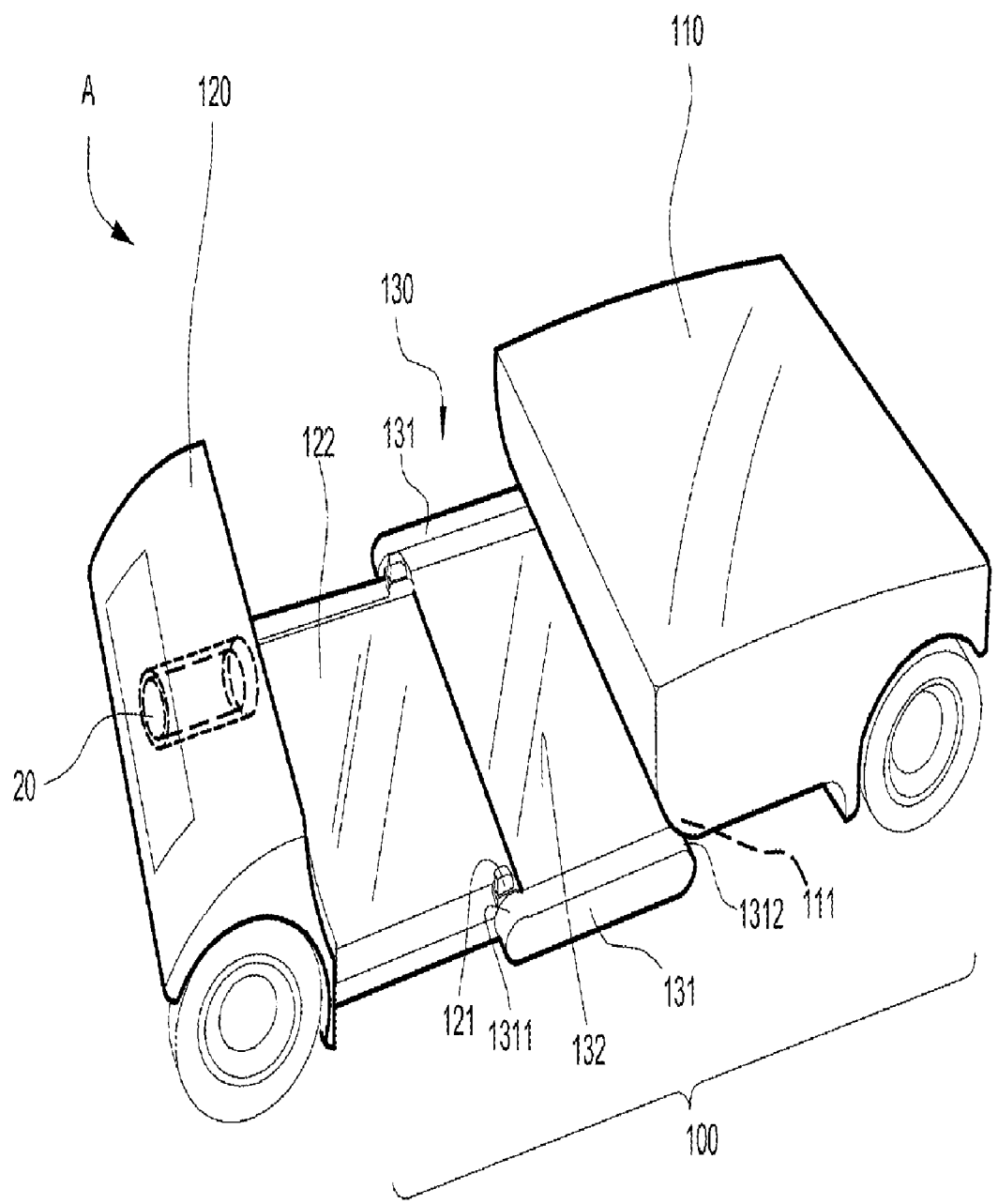
FIG. 1 is a schematic view of an unfolded state of a foldable vehicle frame according to an embodiment of the present invention.

The preferred embodiment of the present invention is described below in detail with reference to the drawings. Based upon the descriptions in the specification of the present invention, those skilled in the art can easily understand other advantages and functions of the present invention. The present invention may also be implemented through other different embodiments. It will be apparent to those skilled in the art that various modifications and variations can be made to the structure of the present invention without departing from the scope or spirit of the invention.

It should be noted that the accompanying drawings in the specification of the present invention are merely simplified schematic views, which are intended to demonstrate the basic structure of the present invention in a schematic manner. Therefore, in the drawings, only the elements relevant to the present invention are marked, and the elements in the drawings are not depicted according to the number, shape, and size proportion in the practical implementation. The size or specification of the elements in the practical implementation is actually a selective design, and the element layout may be more complex.

Figure 2:
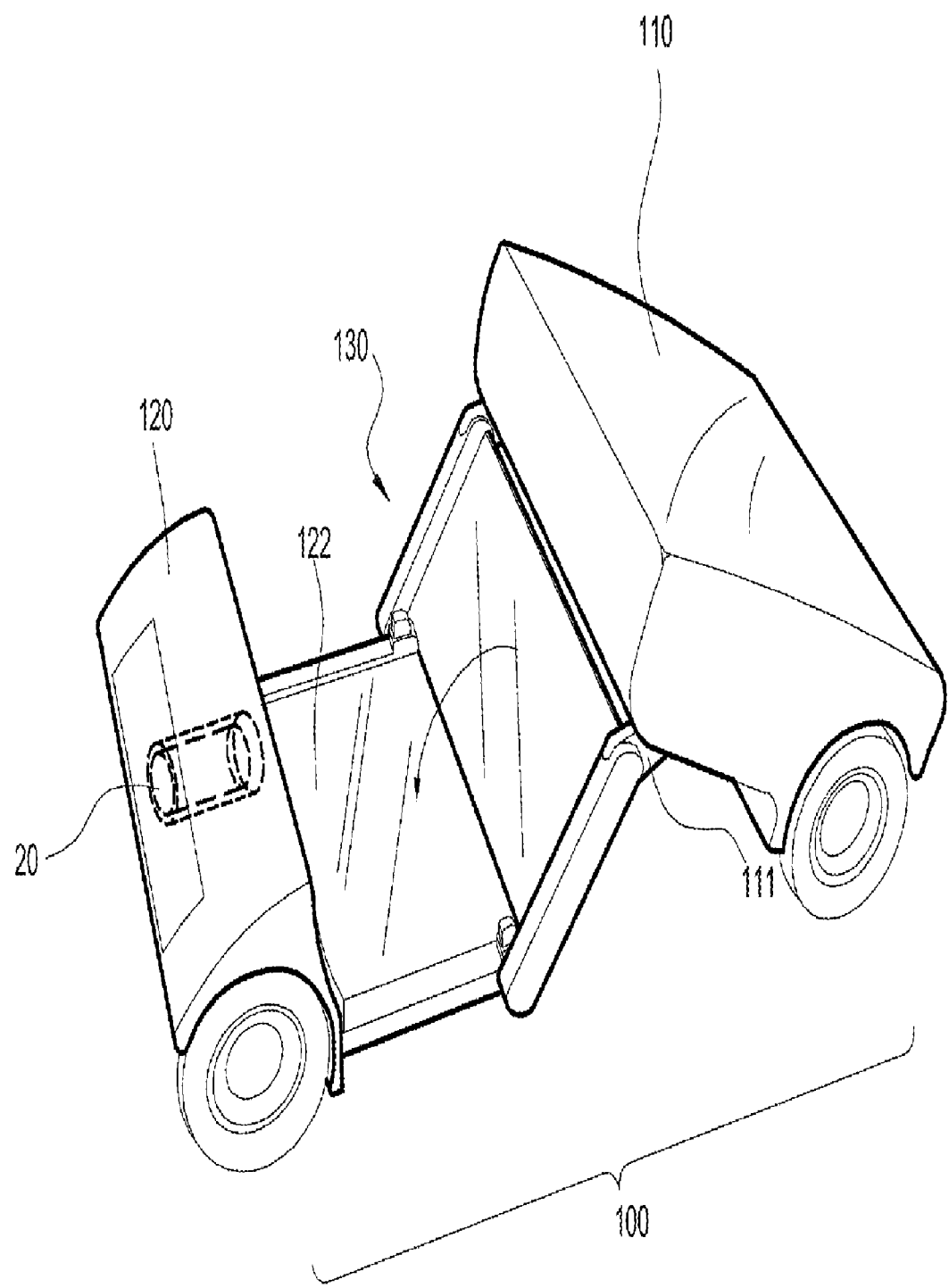
FIG. 2 is a schematic view of a folded stage of the foldable vehicle frame according to an embodiment of the present invention.
Figure 2A:
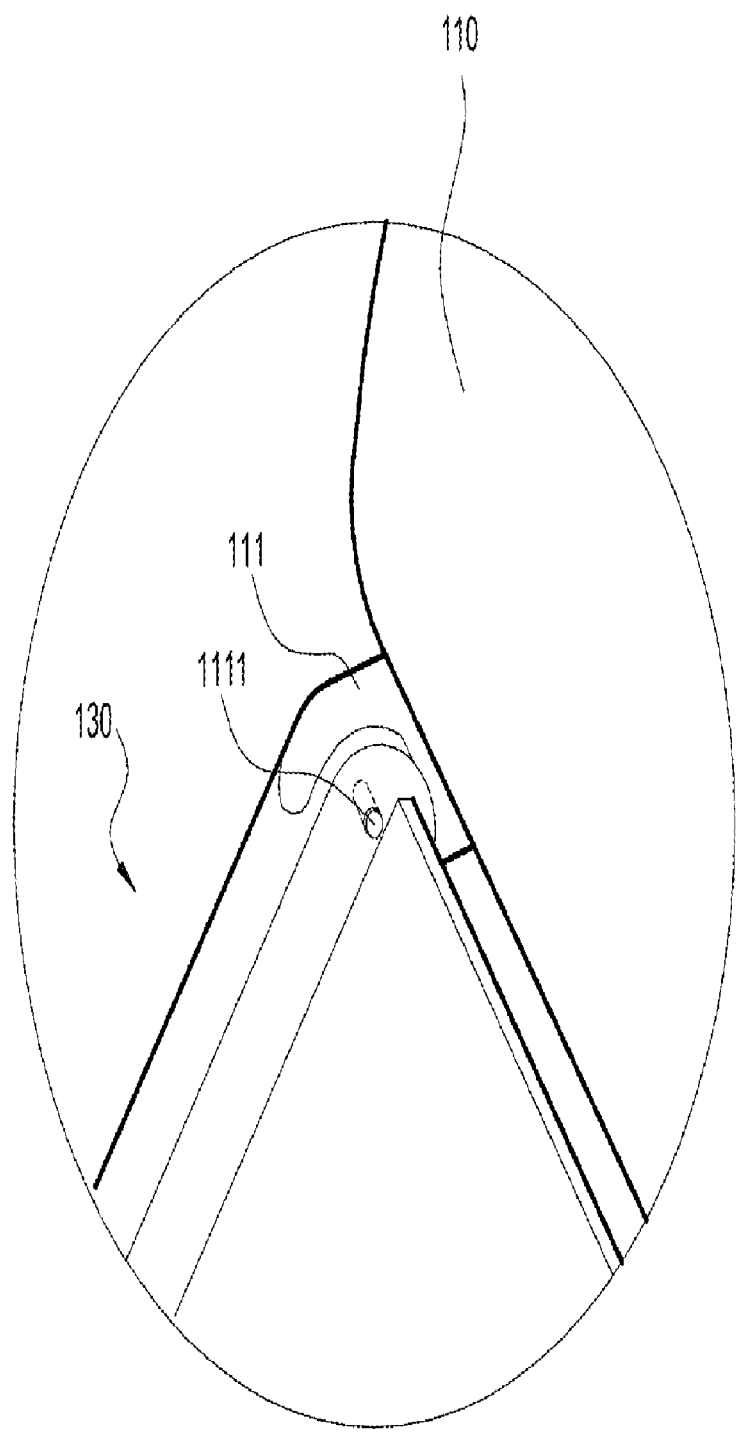
FIG. 2A is a schematic view of a joint portion of the first main body which includes a pin connecting a connecting rod and the joint portion.
Figure 3:
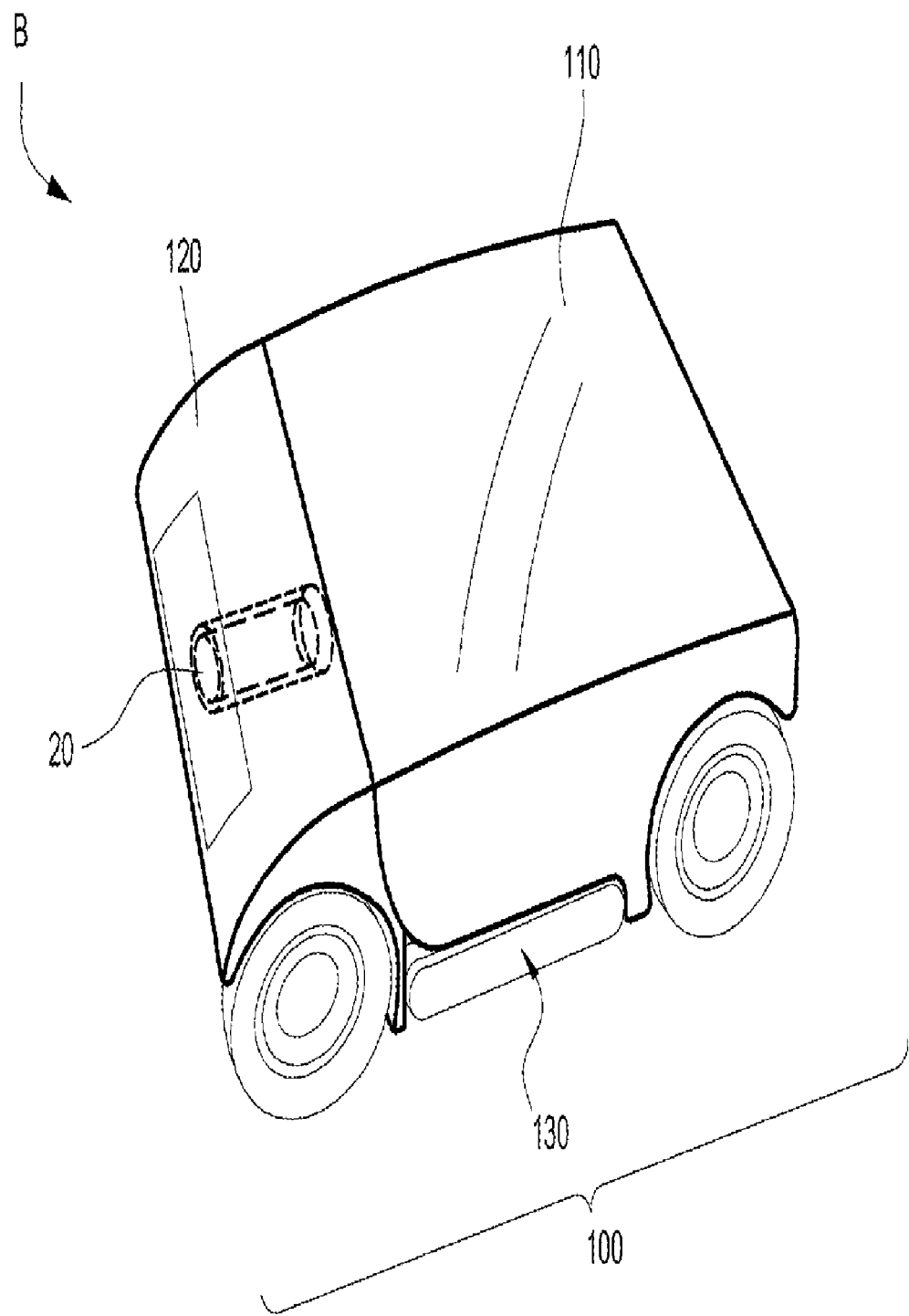
FIG. 3 is a schematic view of a folded state of the foldable vehicle frame according to an embodiment of the present invention.

FIGS. 1, 2, and 3 are respectively schematic views of a folding process according to an embodiment of the present invention. A foldable vehicle frame 100 in an embodiment of the present invention has a folded state B and an unfolded state A. The foldable vehicle frame 100 includes: a first main body 110, having at least one joint portion 111; a second main body 120, having a pedal portion 122 and at least one joint portion 121; and a connecting mechanism 130, connected to the joint portion 111 of the first main body 110 and the joint portion 121 of the second main body 120. FIG. 2A shows a close up schematic view of a joint portion (111), which includes a pin (1111), connecting the first main body (110) to a connecting mechanism (130). The connecting mechanism 130 further includes a pair of rod parts 131, and the pair of rod parts 131 respectively has a head end 1311 and a tail end 1312. A plate part 132 for the rider to put feet thereon may also be disposed between the rod parts 131. The head end 1311 is rotatably connected to the joint portion 111 of the first main body 110, and the tail end 1312 is rotatably connected to the joint portion 121 of the second main body 120, such that the connecting mechanism 130 is turned over and stacked at a lower layer of the first main body 110, and the pedal portion 122 of the second main body 120 is folded under the turned-over connecting mechanism 130 to form the folded state B. On the other aspect, the connecting mechanism 130, the first main body 110, and the second main body 120 are all unfolded to a limiting angle, so as to form the unfolded state A.

Figure 4:
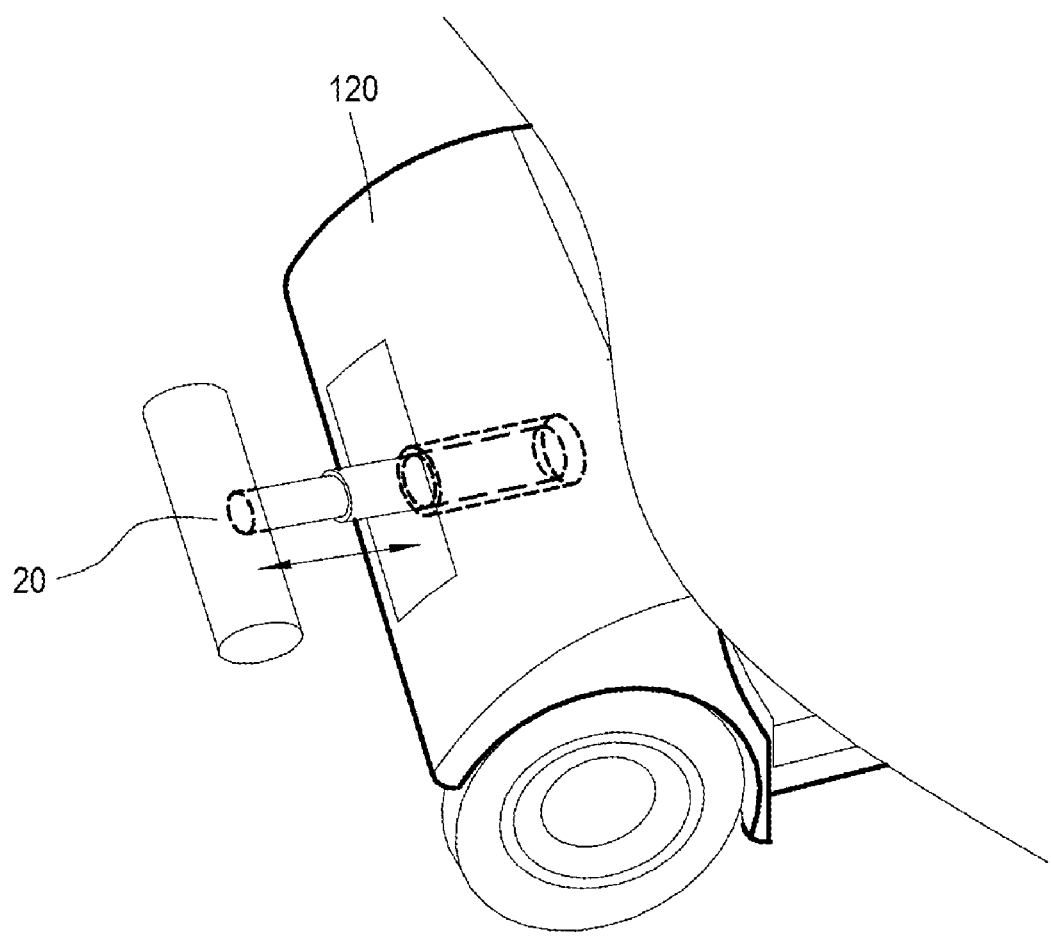
FIG. 4 is a schematic view of a retractable handle of the foldable vehicle frame according to an embodiment of the present invention.
Figure 5:
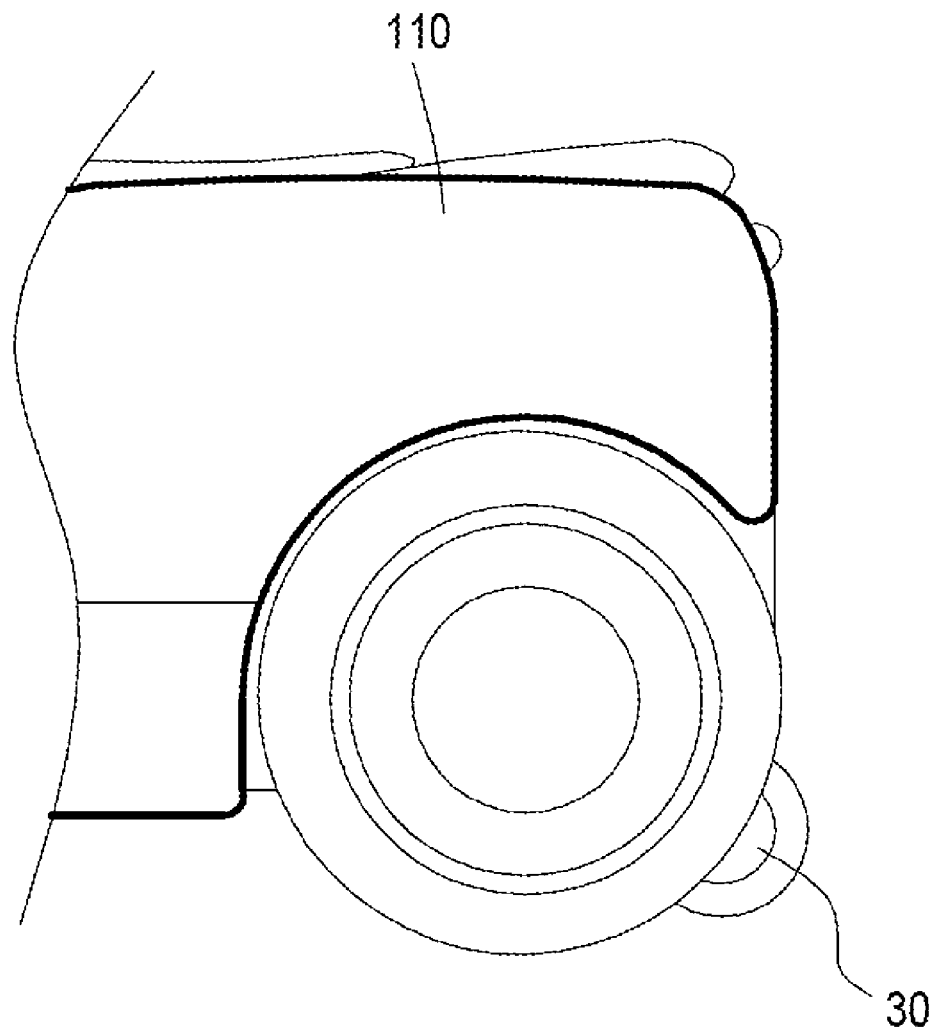
FIG. 5 is a schematic view of an anti-tip wheel of the foldable vehicle frame according to an embodiment of the present invention.
Figure 6:
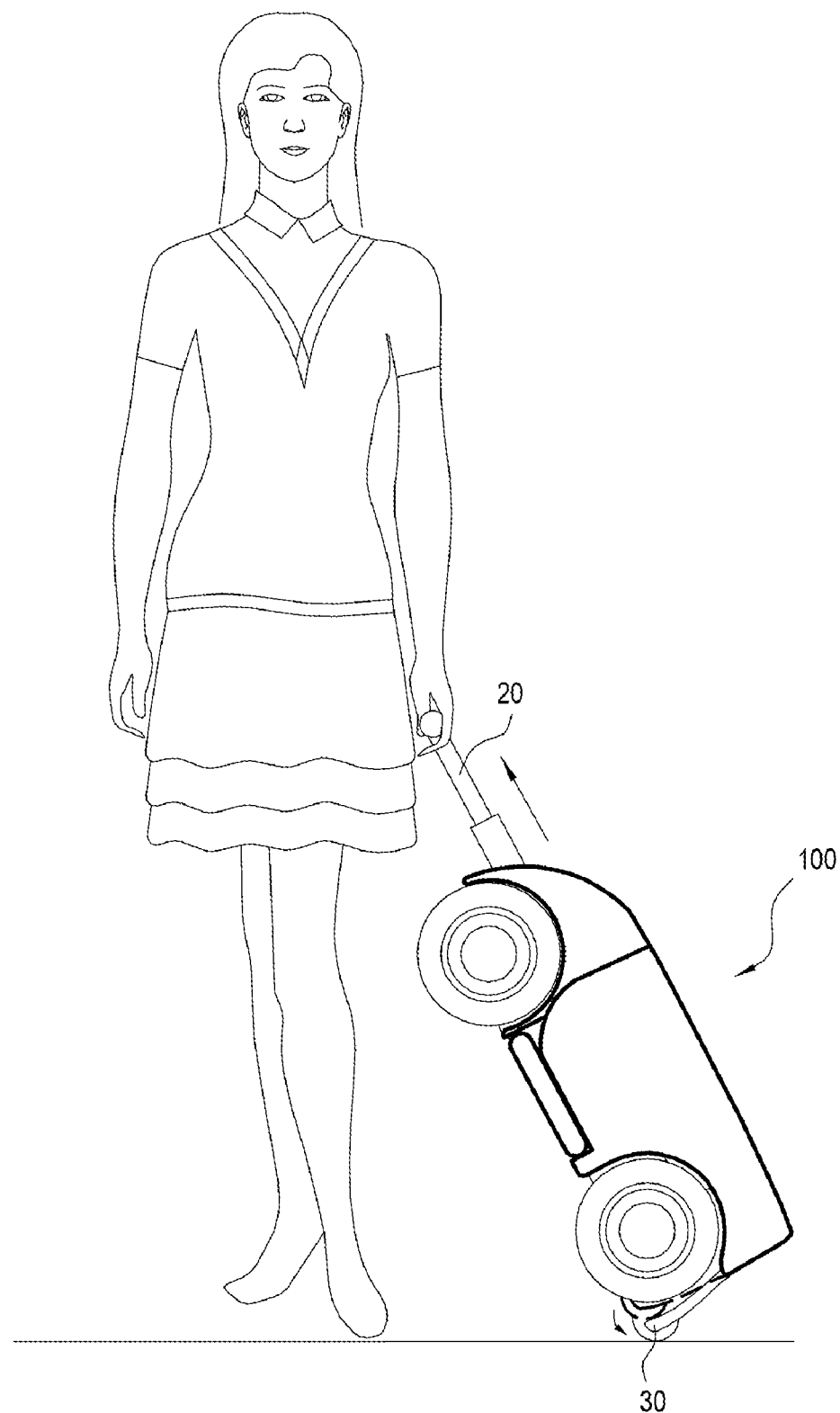
FIG. 6 is a schematic view of an accommodated state of the foldable vehicle frame according to an embodiment of the present invention, when being pulled.

FIG. 4 is a schematic view of a retractable handle of the foldable vehicle frame according to an embodiment of the present invention, and FIG. 5 is a schematic view of an anti-tip wheel of the foldable vehicle frame according to an embodiment of the present invention. In the embodiment of the present invention, a retractable handle 20 is further disposed on a front end of the second main body 120, and the first main body 110 further has at least one set of anti-tip wheels 30 on an end surface thereof. Definitely, in this embodiment, the retractable handle 20 is capable of multiple height adjustments through multi-segment design, which may also be changed to many other design manners, for example single segment, or being pulled from a lateral side and turned to the front side, which are simple alternative designs of the retractable handle 20 of the present invention, and also fall within the scope of the present invention. The retractable handle 20 of this embodiment is disposed corresponding to the anti-tip wheels 30 on the end surface of the first main body 110. Particularly, when the first main body 110 and the second main body 120 are folded into the folded state B, the anti-tip wheels 30 are retracted towards the first main body 110 (definitely, when the first main body 110 and the second main body 120 are in the unfolded state A, the anti-tip wheels 30 are also in the extended state), so as to reduce the volume. However, when the retractable handle 20 is grasped to pull out, the anti-tip wheels 30 are also changed into the extended state, so as to serve as casters (ground pulleys), which are convenient to pull and take along the foldable vehicle frame, as shown in FIG. 6. FIG. 6 is a schematic view of an accommodated state of the foldable vehicle frame according to an embodiment of the present invention, when being pulled.

It should be noted that, when the folded state or the unfolded state is formed among the first main body 110, the connecting mechanism 130, and the second main body 120, a catching mechanism (not shown) needs to be disposed to catch and fix the relative positions of the first main body 110, the second main body 120, and the connecting mechanism 130, so as to ensure the safety in usage. The catching mechanism is a clipping mechanism commonly used in the mechanism design, for example, the first main body 110, the connecting mechanism 130 and the second main body 120 are fixed by a pin shaft, screw lock, or buckle, which are not shown in the figures.

Figure 7:
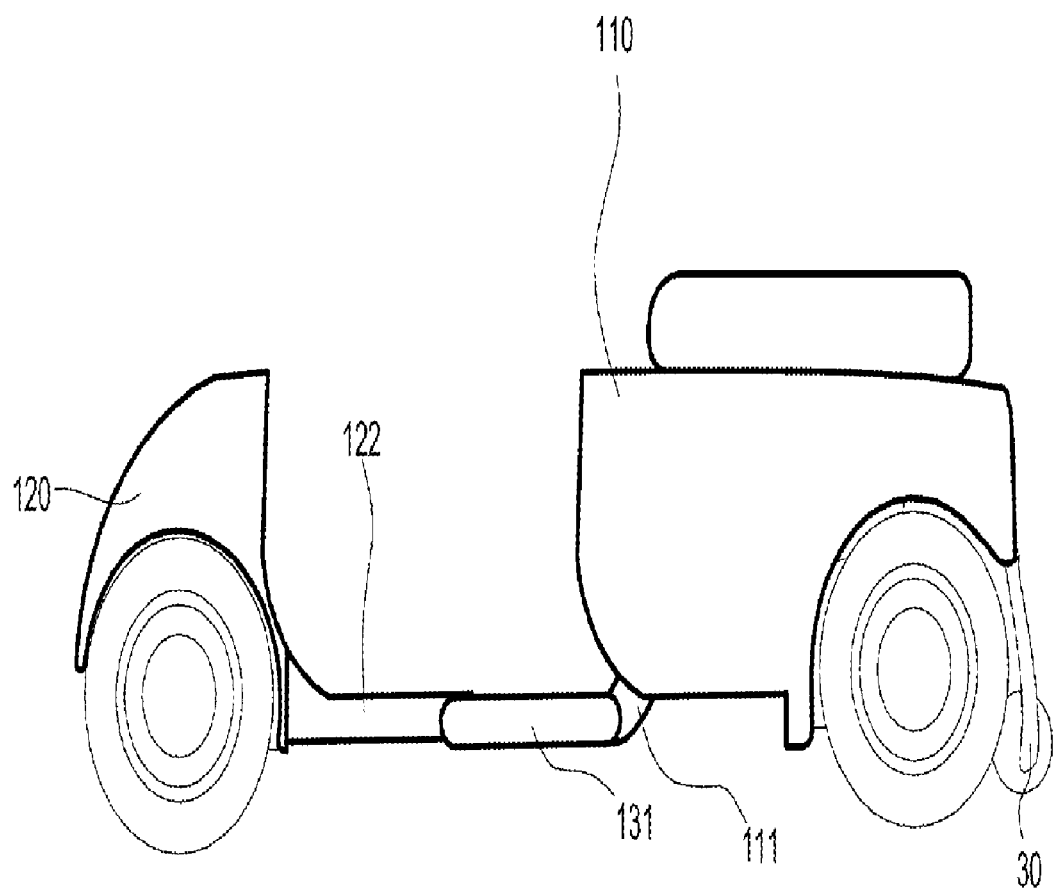
FIG. 7 is a schematic view of an embodiment of the invention when suitable as a personal or electric scooter.

FIG. 7 is a schematic view of one embodiment of the foldable vehicle frame able to perform as a personal or electric scooter. The foldable vehicle frame is shown in an unfolded state which includes a first main body 110, a second main body 120, a connecting joint portion 111, one of a pair of rods parts 131, a pedal portion 122, and anti-tip wheels 30.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A foldable vehicle frame, having a folded state and an unfolded state, comprising:
   a first main body, having at least one joint portion;
   a second main body, having a pedal portion and at least one joint portion; and
   a connecting mechanism, for connecting to the joint portion of the first main body and the joint portion of the second main body, wherein the connecting mechanism comprises a pair of rod parts, the pair of rod parts respectively has a head end and a tail end, the head end is rotatably connected to the joint portion of the first main body, the tail end is rotatably connected to the joint portion of the second main body, such that the connecting mechanism is turned over and stacked at a lower layer of the first main body, and the pedal portion of the second main body is folded under the turned-over connecting mechanism to form the folded state; and
   the connecting mechanism, the first main body, and the second main body are all unfolded to a limiting angle, so as to form the unfolded state.

2. The foldable vehicle frame according to claim 1, wherein the first main body is a tail portion of a vehicle, and the second main body is a head portion of the vehicle.

3. The foldable vehicle frame according to claim 1, wherein the first main body is a head portion of a vehicle, and the second main body is a tail portion of the vehicle.

4. The foldable vehicle frame according to claim 1, wherein the connecting mechanism further comprises a plate part disposed between the pair of rod parts.

5. The foldable vehicle frame according to claim 1, wherein the joint portion of the first main body or the second main body has a connecting rod, and correspondingly, a connecting end of the connecting mechanism is a base seat.

6. The foldable vehicle frame according to claim 5, wherein the connecting rod and the joint portion of the first main body are connected by a pin.

7. The foldable vehicle frame according to claim 5, wherein the connecting rod and the joint portion of the first main body are connected by a bearing.

8. The foldable vehicle frame according to claim 1, wherein the vehicle frame is a personal scooter or an electric scooter.

9. The foldable vehicle frame according to claim 1, wherein the second main body further comprises a retractable handle on an end surface thereof, and the first main body further comprises at least one set of anti-tip wheels on an end surface thereof.

10. The foldable vehicle frame according to claim 9, wherein when the retractable handle is pulled out, the set of anti-tip wheels is extended to form ground casters.

* * * * *